(12) United States Patent
Carceller et al.

(10) Patent No.: US 8,877,864 B2
(45) Date of Patent: Nov. 4, 2014

(54) ANIONIC DISPERSION POLYMERIZATION PROCESS

(75) Inventors: Rosa Carceller, Espoo (FI); Ari Juppo, Vaasa (FI)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 13/877,506

(22) PCT Filed: Oct. 14, 2011

(86) PCT No.: PCT/FI2011/050890
§ 371 (c)(1),
(2), (4) Date: May 10, 2013

(87) PCT Pub. No.: WO2012/049371
PCT Pub. Date: Apr. 19, 2012

(65) Prior Publication Data
US 2013/0303675 A1 Nov. 14, 2013

Related U.S. Application Data

(60) Provisional application No. 61/393,420, filed on Oct. 15, 2010.

(30) Foreign Application Priority Data

Oct. 15, 2010 (FI) .................................... 20106068

(51) Int. Cl.
| | | |
|---|---|---|
| C08G 73/10 | (2006.01) | |
| C08F 2/38 | (2006.01) | |
| C08F 2/16 | (2006.01) | |
| C08L 33/26 | (2006.01) | |
| C08F 220/56 | (2006.01) | |
| C08F 220/18 | (2006.01) | |
| C08F 220/06 | (2006.01) | |

(52) U.S. Cl.
CPC . *C08L 33/26* (2013.01); *C08F 2/38* (2013.01); *C08F 2/16* (2013.01); *C08F 2220/1891* (2013.01); *C08F 220/06* (2013.01); *C08F 220/56* (2013.01)
USPC ............ 524/845; 524/807; 524/817; 524/832

(58) Field of Classification Search
USPC .................................. 524/845, 807, 817, 832
See application file for complete search history.

(56) References Cited

U.S. PATENT DOCUMENTS

| | | |
|---|---|---|
| 2,869,977 A | 1/1959 | Richter et al. |
| 3,018,197 A | 1/1962 | Covington et al. |
| 3,142,568 A | 7/1964 | Nottorf |

FOREIGN PATENT DOCUMENTS

| | | |
|---|---|---|
| CN | 101402853 A | 4/2009 |
| EP | 0183466 A2 | 6/1986 |
| EP | 0546514 A1 | 6/1993 |
| GB | 955197 A | 4/1964 |
| JP | 48042218 B | 12/1973 |
| WO | 9734933 A1 | 9/1997 |
| WO | 0118063 A1 | 3/2001 |
| WO | 0118064 A1 | 3/2001 |

OTHER PUBLICATIONS

International Search Report and Written Opinion dated Jan. 12, 2012.
Tang, et al., "Effects of Initiator Structure on Activation Rate Constants in ATRP," Macromolecults 2007, 40,1858-1863.

*Primary Examiner* — Edward Cain
(74) *Attorney, Agent, or Firm* — Thomas Horstemeyer, LLP

(57) ABSTRACT

The invention provides an anionic dispersion polymerization process, wherein the polymerization is improved by an organic isothiocyanate, such as methyl isothiocyanate.

16 Claims, No Drawings

ANIONIC DISPERSION POLYMERIZATION PROCESS

CROSS REFERENCE TO RELATED APPLICATION

This application is the 35 U.S.C. §371 national stage of PCT application entitled "Anionic Dispersion Polymerization Process," having Ser. No. PCT/FI2011/050890, filed on 15 Oct. 2011, which claims priority to Finland Application No. 20106068, filing date Oct. 15, 2010, and U.S. Provisional Application No. 61/393,420, filing date Oct. 15, 2010, both of which are incorporated by reference in their entireties.

TECHNICAL FIELD

The present invention relates to an anionic dispersion polymerization process, especially a process for the preparation of an anionic, high molecular weight water soluble dispersion polymer. The produced polymers are useful as flocculants and especially as retention and drainage aids in the manufacture of paper.

BACKGROUND OF THE INVENTION

In the use of water soluble polymer flocculants, one problem is how to dissolve the polymer into water so that it can be utilized for its intended purpose. Early water soluble polymers were provided as dilute aqueous solutions. As the technology improved, and the molecular weights of the polymers were improved, it becomes increasingly difficult for manufacturers to ship these polymers in solution form because of the high viscosity of even one-half to one percent solutions of the polymers. Manufacturers accordingly started shipping the polymers in the form of comminuted solids which could be dissolved into water using various mechanical means. While solving shipment problems, some mechanical means degraded the polymers through shear, and, incomplete dissolution of water soluble polymers, the formation of swollen translucent particles, was common. This led to a waste of polymer, and in some cases, detrimental results such as in the case of so called "fish-eye" particles which caused defects in the manufacture of paper. In the early 1970's water-in-oil emulsions of water soluble polymers were introduced. Using the water-in-oil technology, high molecular weight polymers that rapidly dissolved could be produced, and this technology achieved great acceptance in the water soluble polymer industry. A disadvantage of the water-in-oil emulsion polymer technology however is that the emulsions contain substantial quantities of hydrocarbon liquid. The introduction of hydrocarbon liquids into the systems where these water soluble polymers are used is not always beneficial.

In the manufacture of paper, a papermaking furnish is formed into a paper sheet.

The papermaking furnish is an aqueous slurry of cellulosic fiber having a fiber content of less than 4% by weight (percent dry weight of solids in the furnish), and generally about 1.5% or less, and often below 1% ahead of the paper machine, while the finished sheet typically has less than 6% by weight water. Hence the dewatering and retention aspects of papermaking are extremely important to the efficiency and cost of the manufacture.

Various chemical additives have been utilized in an attempt to increase the rate at which water drains from the formed sheet, and to increase the amount of fines and filler retained on the sheet. The use of high molecular weight water-soluble polymers is a significant improvement in the manufacture of paper. The high molecular weight polymers act as flocculants, forming large flocs which deposit on the sheet. They also aid in the dewatering of the sheet.

There is a continuing need to develop more efficient retention aids and processes for producing the same.

U.S. Pat. No. 5,605,970 discloses a method for the manufacture of a particular anionic water soluble polymer in dispersion form. This disclosure teaches that certain anionic polymers, incorporating hydrophobically modified monomers, can be prepared using dispersion polymer methods. The application specifically teaches the manufacture of acrylic acid-ethylhexylacrylate polymers. The ethylhexylacrylate monomer adds a hydrophobic character to the polymer, causing the polymer to become insoluble in certain brine solutions. While these polymers, and the methods for their manufacture are useful, the incorporation of a hydrophobic monomer into a water soluble polymer, where water solubility is desirable is not always advantageous in the final use of the polymer. Moreover, the useful stabilizer disclosed therein is described as having low levels of some hydrophobic monomer along with NaAMPS and/or sodium acrylate.

EP 0 183 466 discloses a process for the production of a water-soluble polymer dispersion in the presence of a dispersant, wherein the dispersant may be a poly(2-acrylamido-2-methyl propane sulfonic acid (AMPS)) or a copolymer having 30 or more mole percent of AMPS.

U.S. Pat. No. 5,837,776 discloses a composition and a method of making a dispersion in the presence of a stabilizer copolymer, wherein the stabilizer copolymer contains at least 20 mole percent acrylamidomethyl propane sulfonic acid. The dispersion polymers prepared as described in this patent are prepared at a pH of from 2 to 5.

U.S. Pat. No. 6,417,268 discloses a method for making hydrophobically associative polymers using a brine dispersion method. The method comprises forming a monomer solution containing a surfactant, a hydrophobic monomer, a hydrophilic monomer and water, mixing the monomer solution and a salt solution containing a multivalent salt, stabilizer and water, and charging the mixed solution with an initiator to cause polymerization. The stabilizer is crucial to the method since it affects the homogeneity of the dispersion. Preferred stabilizers are vegetable gums, polysaccharides and cellulose products.

WO 01/18064 discloses a high molecular weight water-soluble dispersion polymer and a method of preparing the same. The dispersion polymer comprises from about 5 to about 50% by weight of a water soluble polymer prepared by polymerizing under free radical forming conditions in an aqueous solution of a water-soluble salt in the presence of a stabilizer 0-30 mole percent of at least one anionic monomer, and 100-70 mole percent of at least one non-ionic monomer, wherein the stabilizer is an anionic water soluble polymer, and the water soluble salt comprises from 5 to 40% by weight based on the weight of the dispersion. The polymerization is carried out at a pH greater than 5.

WO 01/18063 discloses a method of increasing retention and drainage in a papermaking furnish comprising adding to the furnish an effective flocculating amount of a high molecular weight water-soluble dispersion polymer defined in the above WO publication.

SUMMARY OF THE INVENTION

According to the present invention it was surprisingly found that by introducing an organic isothiocyanate into an anionic dispersion polymerization process as an improver, it is possible to control the polymerization reaction speed and to obtain anionic, high molecular weight water soluble polymers which are useful as flocculants and especially as retention and drainage aids in the manufacture of paper.

DETAILED DESCRIPTION OF THE INVENTION

The invention provides an anionic dispersion polymerization process, wherein the polymerization is improved by an organic isothiocyanate.

It is believed that the organic isothiocyanate makes it possible to control the polymerization reaction speed to get a stabile dispersion and to tailor the various properties of the final polymer.

The organic isothiocyanate compound is preferably an alkyl, alkenyl, aryl or aralkyl isothiocyanate, more preferably an alkyl isothiocyanate. "Alkyl" means a straight or branched hydrocarbon radical having from 1 to 6 carbon atoms such as methyl, ethyl or propyl. "Alkenyl" means a straight or branched unsaturated hydrocarbon radical having from 2 to 6 carbon atoms and one or more double bonds, such as allyl. "Aryl" means a monovalent aromatic hydrocarbon radical having a single ring or multiple condensed rings, such as phenyl. "Aralkyl" means a radical in which an aryl group is substituted for an alkyl H atom, such as benzyl or phenylethyl. The aryl groups may be substituted by substituents such as halogen, alkyl or alkoxy.

In this specification the term "organic isothiocyanate" should be understood to also include organic isothiocyanates formed by isomerization from organic thiocyanates.

The amount of the organic isothiocyanate is preferably from 0.1 to 1.0%, more preferably from 0.3 to 0.8% by weight based on the total weight of the monomers.

In a preferred embodiment, the invention comprises an anionic, radical dispersion polymerization process for the preparation of an anionic dispersion polymer which comprises polymerizing under free radical forming conditions a mixture comprising
i) a water soluble anionic ethylenically unsaturated monomer and/or a water soluble nonionic ethylenically unsaturated monomer,
ii) optionally a nonionic hydrophobic ethylenically unsaturated monomer,
iii) an improver comprising the organic isothiocyanate,
iv) a stabilizer,
v) an initiator,
vi) a water soluble salt, and
vii) water.

"Monomer" means a polymerizable ethylenically unsaturated monomer including allylic, vinylic and acrylic compounds.

"Water soluble anionic monomer" means a monomer as defined herein which possesses a net negative charge. Representative water soluble anionic monomers include acrylic acid, methacrylic acid, 2-acrylamido-2-methyl-1-propanesulfonic acid, acrylamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and the water soluble alkali metal, alkaline earth metal, and ammonium salts thereof. The choice of anionic monomer is based upon several factors including the ability of the monomer to polymerize with the desired comonomer, if present, the use of the produced polymer, and cost. It is also possible to use a mixture of two or more anionic monomers. A preferred anionic monomer is acrylic acid.

In certain instances, it may be possible to chemically modify a nonionic monomer component contained in the dispersion polymer of the invention after polymerization to obtain an anionic functional group, for example, the modification of an incorporated acrylamide mer unit to the corresponding sulfonate or phosphonate or maleic anhydride to maleic acid.

"Water soluble nonionic monomer" means a monomer as defined herein which is electrically neutral. Representative water soluble nonionic monomers include acrylamide, methacrylamide, N-methylacrylamide, N-isopropylacrylamide, N-t-butyl acrylamide, N-methylolacrylamide, N,N-dimethyl(meth)acrylamide, N-isopropyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acrylate, N-vinyl-2-pyrrolidone, glycerol mono((meth)acrylate), 2-hydroxyethyl(meth)acrylate, vinyl methylsulfone, vinyl acetate, and the like. It is also possible to use a mixture of two or more nonionic monomers. Preferred nonionic monomers include acrylamide, methacrylamide, N-isopropylacrylamide, N-t-butyl acrylamide, and N-methylolacrylamide. More preferred nonionic monomers include acrylamide and methacrylamide. Acrylamide is still more preferred.

"Nonionic hydrophobic monomer" means a monomer as defined herein which is electrically neutral. Preferred nonionic hydrophobic monomers include water-insoluble monomers having hydrophobic groups. The hydrophobic groups include aliphatic hydrocarbon groups such as alkyl groups having from 6 to 22 carbon atoms, preferably from 8 to 20 carbon atoms. Suitable monomers include esters and amides of $C_6$ to $C_{20}$ alkyl groups. Particular suitable esters include dodecyl acrylate, dodecyl methacrylate, tridecyl acrylate, tridecyl methacrylate, tetradecyl acrylate, tetradecyl methacrylate octadecyl acrylate and octadecyl methacrylate. It is also possible to use a mixture of two or more nonionic hydrophobic monomers. A preferred nonionic hydrophobic monomer is dodecyl acrylate (lauryl acrylate).

"Anionic dispersion polymer" means a dispersion polymer as defined herein which possesses a net negative charge. More specifically, anionic dispersion polymer means a water-soluble polymer dispersed in an aqueous continuous phase containing one or more inorganic salts. In the process of dispersion polymerization, the monomer and the initiator are both soluble in polymerization medium, but the medium is a poor solvent for the resulting polymer. Accordingly, the reaction mixture is homogeneous at the onset, and polymerization is initiated in a homogeneous solution. Depending on the solvency of the medium for the resulting oligomers or macroradicals and macromolecules, phase separation occurs at an early stage. This leads to nucleation and the formation of primary particles called "precursors" and the precursors are colloidally stabilized by adsorption of stabilizers. The particles are believed to be swollen by polymerization medium and/or the monomer, leading to the formation of spherical particles having a size in the region of about 0.01-10.0 µm.

In anionic dispersion polymerization, the variables that are usually controlled are the concentrations, copolymer composition and molar mass of the stabilizer, the monomer and the initiator, solvency of the dispersion medium, and the reaction temperature. These variables can have a significant effect on the particle size, the molecular weight of the final polymer particles, and the kinetics of polymerization process.

Particles produced by dispersion polymerization in the absence of any stabilizer are not sufficiently stable and may coagulate after their formation. Addition of a small percentage of a suitable stabilizer to polymerization mixture produces stable dispersion particles. Particle stabilization in dispersion polymerization is usually referred to as "steric stabilization". Good stabilizers for dispersion polymerization are polymer or oligomer compounds that are soluble or mostly soluble in polymerization medium and moderate affinity for the polymer particles.

The above components i) and ii) of the water solution may comprise from 1 to 99 mole percent, preferably from 10 to 70 mole percent of anionic monomer, from 99 to 1 mole percent, preferably from 90 to 30 mole percent of water soluble nonionic monomer and from 0 to 10 mole percent of nonionic hydrophobic monomer. The water solution preferably comprises from 1 to 40 mole percent, more preferably from 10 to 40 mole percent, and most preferably from 20 to 40 mole percent of anionic monomer and from 99 to 60 mole percent, more preferably from 90 to 60 mole percent, and most preferably from 80 to 60 of water soluble nonionic monomer, and from 0 to 2 mole percent, more preferably from 0.1 to 2 mole percent, and most preferably from 0.25 to 1 mole percent of nonionic hydrophobic monomer.

The anionic dispersion polymers of the instant invention preferably contain from about 2 to about 20% by weight, more preferably from about 3 to about 17% and still more preferably, from about 4 to about 12% by weight based on the total weight of the monomers of a stabilizer (component iv)).

Suitable stabilizers are water soluble polymers having a molecular weight of from about 300 to about 10,000,000 and containing in the polymer structural units at least one functional group selected from ether, hydroxyl, carboxyl, sulfonic, sulfate ester, amino, imino, tertiary amino, quaternary ammonium and hydrazino groups.

Examples of stabilizer polymers include polymers containing an ether, hydroxyl or carboxyl group, such as agar, gum arabic, dextran, starch, starch derivatives, cellulose derivatives, polyethylene glycol, polyethylene oxide, polypropylene glycol, a copolymer of ethylene glycol and propylene glycol, and polyvinyl alcohol, and polymers containing other groups such as polyvinyl pyrrolidone, polyvinylpyridine and polyethyleneimine.

Preferred stabilizers as used herein include anionically charged water soluble polymers having a molecular weight of from about 100,000 to about 5,000,000 and preferably from about 1,000,000 to about 3,000,000. The stabilizer polymer must be soluble or mostly soluble in the salt solution, and must be soluble in water. These stabilizers are preferably in the form of a salt, such as sodium salt.

Preferred stabilizers are polyacrylic acid, poly(meth) acrylic acid, poly(2-acrylamido-2-methyl-1-propanesulfonic acid) and copolymers of 2-acrylamido-2-methyl-1-propanesulfonic acid and an anionic comonomer selected from acrylic acid and methacrylic acid.

Typically the stabilizer polymers are prepared using conventional solution polymerization techniques, are prepared in water-in-oil emulsion form or are prepared using conventional dispersion polymerization techniques. The choice of a particular stabilizer polymer will be based upon the particular polymer being produced, the particular salts contained in the salt solution, and the other reaction conditions to which the dispersion is subjected during the formation of the polymer.

The anionic dispersion preferably comprises from about 2 to about 20% by weight, more preferably from about 3 to about 17% and still more preferably, from about 4 to about 12% by weight of stabilizer, based on the total weight of the monomers.

The remainder of the anionic dispersion preferably comprises an aqueous solution comprising from about 2 to about 40% by weight based on the total weight of the anionic dispersion of a water soluble salt (component vi)) which preferably is selected from the group consisting of ammonium, alkali metal and alkaline earth metal halides, sulfates, and phosphates and mixtures thereof.

The salt is important in that the polymer produced in such aqueous media will be rendered insoluble on formation, and polymerization will accordingly produce particles of water soluble polymer when suitable agitation is provided. The selection of the particular salt to be utilized is dependent upon the particular polymer to be produced, and the stabilizer to be employed. The selection of salt, and the amount of salt present should be made such that the polymer being produced will be insoluble in the salt solution. Particularly useful salts include a mixture of ammonium sulfate and sodium sulfate in such quantity to saturate the aqueous solution. While sodium sulfate may be utilized alone, it may alter the precipitation process during polymerization. Salts containing di- or trivalent anions are preferred because of their reduced solubility in water as compared to for example alkali, alkaline earth, or ammonium halide salts, although monovalent anion salts may be employed in certain circumstances. The use of salts containing di- or trivalent anions generally results in polymer dispersions having lower percentages of salt materials as compared to salts containing monovalent anions.

The particular salt to be utilized is determined by preparing a saturated solution of the salt or salts, and determining the solubility of the desired stabilizer and the desired polymer. Preferably from about 5 to about 40, more preferably from about 10 to about 30 and still more preferably from about 12 to about 25% by weight based on the weight of the dispersion of the salt is utilized. When using higher quantities of monomer less salt will be required.

In addition to the above, other ingredients may be employed in making the polymer dispersions of the present invention. These additional ingredients may include chelating agents designed to remove metallic impurities from interfering with the activity of the free radical catalyst employed, chain transfer agents like thioglycolic acid or alcohols or formic acid or formates or lactic acid or lactates to regulate molecular weight, nucleating agents and codispersant materials.

The total amount of water soluble anionic polymer prepared from the anionic and/or the nonionic water soluble monomers and optionally the nonionic hydrophobic monomer in the dispersion may vary from about 5 to about 50% by weight of the total weight of the dispersion, and preferably from about 10 to about 40% by weight of the dispersion. Most preferably the dispersion contains from about 15 to about 30% by weight of the anionic polymer prepared from the nonionic and/or anionic water soluble monomers and optionally the nonionic hydrophobic monomer.

Polymerization reactions described herein are initiated by an initiator (component v)) which results in generation of a suitable free-radical. Most suitable initiators are thermal and redox initiators. Examples of preferred initiators are azo compounds including 2,2'-azobis(2-amidinopropane) di hydrochloride, 2,2'-azobis[2-(2-imidazolin-2-yl)propane] dihydrochloride (V-044, Wako pure chemical industries), 2,2'-azobis(isobutyronitrile) (AIBN), 2,2'-azobis(2,4-dimethylvaleronitrile) (AIVN), 2,2'-azobis(2-methylpropionamidine)dihydrochloride (V-50 Wako pure chemical industries) and the like., or peroxide initiators, for example bentsoyl peroxide, t-butyl peroxide, t-butyl hydroperoxide and t-butyl perbenzoate. Other preferred initiators are for example sodium bromate/sulfur dioxide, potassium persulfate/sodium sulfite, and ammonium persulfate/sodium sulfite, as well as initiators disclosed in U.S. Pat. No. 4,473, 689. Initiator levels are chosen in a known manner so as to create polymers of the desired molecular weight.

The monomers may be mixed together with the water, improver, initiator, salt and stabilizer prior to polymerization, or alternatively, one or two or all monomers and initiator may be added stepwise during polymerization in order to obtain proper incorporation of the monomers into the resultant anionic dispersion polymer. Polymerizations of this invention may be run at temperatures ranging from 1° C. to as high as the boiling point of the monomers employed. Preferably, the anionic dispersion polymerization is conducted at from 5° C. to about 80° C. More preferably, polymerization is conducted at from about 20° C. to about 60° C. Depending on the initiator type the optimal temperature may vary.

The anionic dispersion polymers of this invention are prepared at a pH lower than 7, preferably between 2 and 7. After polymerization the pH of the dispersion may be adjusted to any desired value as long as the polymer remains insoluble to maintain the dispersed nature. Preferably, polymerization is conducted under inert atmosphere with sufficient agitation to maintain the dispersion.

The anionic dispersion polymers of this invention typically have molecular weights ranging from about 50,000 up to the aqueous solubility limit of the polymer. Preferably, the anionic dispersions have a molecular weight of from about 1,000,000 to about 50 million.

In a preferred embodiment, this invention is directed to anionic dispersion polymers wherein the anionic monomer is selected from the group consisting of acrylic acid, methacrylic acid, 2-acrylamido-2-methyl-1-propanesulfonic acid, acrylamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and the water soluble alkali metal, alkaline earth metal, and ammonium salts thereof and mixtures thereof and the nonionic water soluble monomer is selected from the group consisting of acrylamide, methacrylamide, N-isopropylacrylamide, N-t-butyl acrylamide, and N-methylolacrylamide and mixtures thereof.

In another preferred embodiment, the anionic monomer is acrylic acid or a water soluble alkali metal, alkaline earth metal, or ammonium salt thereof and the nonionic water soluble monomer is acrylamide.

In another preferred embodiment, the stabilizer is an anionic polymer selected from polyacrylic acid, poly(meth)acrylic acid, poly(2-acrylamido-2-methyl-1-propanesulfonic acid); poly(2-acrylamido-2-methyl-1-propanesulfonic acid/acrylic acid) and poly(2-acrylamido-2-methyl-1-propanesulfonic acid/methacrylic acid) and mixtures thereof.

In a more preferred embodiment, the stabilizer has a concentration of from about 3 to about 17%, preferably from about 4 to about 12% by weight based on the weight of monomers.

In another more preferred embodiment, the stabilizer is poly(2-acrylamido-2-methyl-1-propanesulfonic acid/methacrylic acid) comprising from about 20 to about 97 mole percent 2-acrylamido-2-methyl-1-propanesulfonic acid and from about 80 to about 3 mole percent methacrylic acid.

In another more preferred embodiment, the stabilizer is poly(2-acrylamido-2-methyl-1-propanesulfonic acid/methacrylic acid) comprising from about 10 to about 95 mole percent 2-acrylamido-2-methyl-1-propanesulfonic acid and from about 90 to about 5 mole percent methacrylic acid.

In a still more preferred embodiment, the anionic, water-soluble dispersion polymer is poly(acrylic acid/acrylamide) comprising from about 1 to about 40 mole percent, preferably from about 10 to about 40 mole percent, more preferably from about 20 to about 40 mole percent, still more preferably from about 30 to about 40 mole percent, and most preferably about 35 mole percent of acrylic acid, and from about 99 to about 60 mol percent, preferably from about 90 to about 60 mole percent, more preferably from about 80 to about 60 mole percent, still more preferably from about 75 to about 60 mole percent, and most preferably about 65 mole percent of acrylamide. The anionic dispersion polymer may contain a minor amount, preferably from about 0.1 mole percent to about 2 mole percent of the nonionic hydrophobic monomer, which preferably is lauryl acrylate.

In another still more preferred embodiment, the anionic, water-soluble dispersion polymer is poly(acrylic acid/acrylamide) comprising from about 1 to about 40 mole percent, preferably from about 10 to about 40 mole percent, more preferably from about 20 to about 40 mole percent, still more preferably from about 30 to about 40 mole percent, and most preferably about 35 mole percent of acrylic acid, and from about 99 to about 60 mol percent, preferably from about 90 to about 60 mole percent, more preferably from about 80 to about 60 mole percent, still more preferably from about 75 to about 60 mole percent, and most preferably about 65 mole percent of acrylamide, and the stabilizer is poly(2-acrylamido-2-methyl-1-propanesulfonic acid/methacrylic acid) comprising from about 10 to about 97 mole percent, preferably about 40 to about 95 mole percent, more preferably from about 60 to about 90 mole percent, still more preferably from about 70 to about 80 mole percent, and most preferably about 80 mole percent of 2-acrylamido-2-methyl-1-propanesulfonic acid and from about 90 to about 3 mole percent methacrylic acid, preferably from about 60 to about 5 mole percent, more preferably from about 40 to about 10 mole percent, still more preferably from about 30 to about 20 mole percent, and most preferably about 20 mole percent of methacrylic acid. The anionic dispersion polymer may contain a minor amount, preferably from about 0.1 mole percent to about 2 mole percent of the nonionic hydrophobic monomer, which preferably is lauryl acrylate.

EXAMPLES

Example 1

Polymer dispersion

To a 250 mL glass reactor equipped with reflux condenser, nitrogen inlet and paddle stirrer type was added 32.52 g of deionized water and 0.175 g of methyl isothiocyanate. Nitrogen was bubbled through the solution for about 20 minutes. After this and under nitrogen atmosphere, 49.30 g of 50% aqueous solution of acrylamide, 10.94 g of acrylic acid and 0.4 g of 90% lauryl acrylate solution were added into the reactor. Addition of salts: 6.05 g of sodium sulfate and 61.40 g 40% ammonium sulfate solution. And, addition of: 0.077 g of EDTA, 0.852 g of 50% aqueous solution of sodium hydroxide and 0.174 g of sodium formiate. 27 g of 15% aqueous solution of polymeric surfactant (80/20 mole/mole 2-acrylamido-2-methyl-1-propane sulphonic sodium salt/methacrylic acid sodium salt) copolymer was added into the reactor.

After stirring at 120 rpm and dissolving all mixture of chemicals, the mixture was heated to 34° C. Polymerization was initiated by pumping 11 g of 0.1% aqueous solution of V-044 during 8 h. The reaction continues at 34° C. for 21-23 h. The final product was a stable dispersion.

Comparative Example 1

To a 250 mL glass reactor equipped with reflux condenser, nitrogen inlet and paddle stirrer type was added 32.52 g of deionized water. Nitrogen was bubbled through the solution for about 20 minutes. After this and under nitrogen atmosphere, 49.30 g of 50% aqueous solution of acrylamide, 10.94 g of acrylic acid and 0.4 g of 90% lauryl acrylate solution were added into the reactor. Addition of salts: 6.05 g of sodium sulfate and 61.40 g 40% ammonium sulfate solution. And, addition of: 0.077 g of EDTA, 0.852 g of 50% aqueous solution of sodium hydroxide and 0.174 g of sodium formiate. 27 g of 15% aqueous solution of polymeric surfactant (80/20 mole/mole 2-acrylamido-2-methyl-1-propane sulphonic sodium salt/methacrylic acid sodium salt) copolymer was added into the reactor.

After stirring at 120 rpm and dissolving all mixture of chemicals, the mixture was heated to 34 C. Polymerization was initiated by pumping 11 g of 0.1% aqueous solution of V-044 during 8 h. The reaction continues at 34° C. for 21-23 h.

The final product was not a stable dispersion.

The invention claimed is:

1. Anionic dispersion polymerization process, wherein the polymerization is improved by an organic isothiocyanate comprising an alkyl isothiocyanate.

2. The process of claim 1 wherein the organic isothiocyanate comprises methyl isothiocyanate, ethyl isothiocyanate or propyl isothiocyanate.

3. The process of claim 1 wherein the amount of the organic isothiocyanate is from 0.1 to 1.0% by weight based on the total weight of the monomers.

4. The process of claim 1 for the preparation of an anionic dispersion polymer which comprises polymerizing under free radical forming conditions a mixture comprising
   i) a water soluble anionic ethylenically unsaturated monomer and/or a water soluble nonionic ethylenically unsaturated monomer,
   ii) optionally a nonionic hydrophobic ethylenically unsaturated monomer,
   iii) an improver comprising the alkyl isothiocyanate,
   iv) a stabilizer,
   v) an initiator,
   vi) a water soluble salt, and
   vii) water.

5. The process of claim 4 wherein the water soluble anionic monomer comprises acrylic acid, methacrylic acid, 2-acrylamido-2-methyl-1-propanesulfonic acid, acrylamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide or a water soluble alkali metal, alkaline earth metal or ammonium salt thereof, and the water soluble nonionic monomer comprises acrylamide, methacrylamide, N-isopropylacrylamide, N-t-butyl acrylamide or N-methylolacrylamide.

6. The process of claim 4 wherein the nonionic hydrophobic monomer comprises dodecyl acrylate, dodecyl methacrylate, tridecyl acrylate, tridecyl methacrylate, tetradecyl acrylate, tetradecyl methacrylate, octadecyl acrylate or octadecyl methacrylate.

7. The process of claim 4 wherein the stabilizer is an anionic polymer comprising polyacrylic acid, poly(meth)acrylic acid, poly(2-acrylamido-2-methyl-1-propanesulfonic acid), poly(2-acrylamido-2-methyl-1-propanesulfonic acid/acrylic acid) and poly(2-acrylamido-2-methyl-1-propanesulfonic acid/methacrylic acid).

8. The process of claim 4 wherein based on the total weight of the dispersion, the amount of monomers is from 5 to 50% by weight and the amount of the water soluble salt is from 2 to 40% by weight, and wherein, based on the total weight of the monomers, the amount of improver is from 0.1 to 1.0%, and the amount of stabilizer is from 2 to 20%.

9. The process of claim 4 wherein monomers i) and ii) of the dispersion comprise 1-40 mole percent, of anionic monomer, 99-60 mole percent, of water soluble nonionic monomer, and 0-2 mole percent of nonionic hydrophobic monomer.

10. The process of claim 4 wherein the water soluble salt comprises ammonium, alkali metal or alkaline earth metal halides, sulfates or phosphates.

11. The process of claim 1, wherein the amount of the organic isothiocyanate is from 0.3 to 0.8% by weight based on the total weight of the monomers.

12. The process of claim 4, wherein based on the total weight of the dispersion the amount of improver is from 0.3 to 0.8% by weight.

13. The process of claim 4, wherein based on the total weight of the dispersion the amount of stabilizer is from 3 to 17%.

14. The process of claim 4, wherein monomers i) and ii) of the dispersion Comprise 10-40 mole percent of anionic monomer.

15. The process of claim 4 wherein monomers i) and ii) of the dispersion Comprise 90-60 mole percent of water soluble nonionic monomer.

16. The process of claim 4 wherein monomers i) and ii) of the dispersion Comprise 0.1-2 mole percent of nonionic hydrophobic monomer.

* * * * *